US007036373B2

(12) United States Patent
Johnson et al.

(10) Patent No.: US 7,036,373 B2
(45) Date of Patent: May 2, 2006

(54) MEMS GYROSCOPE WITH HORIZONTALLY ORIENTED DRIVE ELECTRODES

(75) Inventors: Burgess R. Johnson, Bloomington, MN (US); Mark W. Weber, Zimmerman, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/881,499

(22) Filed: Jun. 29, 2004

(65) Prior Publication Data

US 2005/0284222 A1    Dec. 29, 2005

(51) Int. Cl.
*G01P 9/04* (2006.01)
(52) U.S. Cl. .............................. 73/504.14; 73/504.12; 73/504.02
(58) Field of Classification Search ............ 73/504.02, 73/504.04, 504.12, 504.14, 504.15, 504.16, 73/514.16, 514.29, 514.32
See application file for complete search history.

(56) References Cited

U.S. PATENT DOCUMENTS

| | | | |
|---|---|---|---|
| 5,025,346 A | | 6/1991 | Tang et al. |
| 5,359,893 A | | 11/1994 | Dunn et al. |
| 5,753,817 A | * | 5/1998 | Park et al. ............... 73/504.12 |
| 5,757,103 A | | 5/1998 | Lee et al. |
| 5,894,090 A | * | 4/1999 | Tang et al. .............. 73/504.02 |
| 5,918,280 A | * | 6/1999 | Gang et al. .............. 73/504.12 |
| 5,992,233 A | | 11/1999 | Clark |
| 6,067,858 A | | 5/2000 | Clark et al. |
| 6,143,583 A | | 11/2000 | Hays |
| 6,158,280 A | | 12/2000 | Nonomura et al. |
| 6,164,134 A | | 12/2000 | Cargille |
| 6,250,156 B1 | | 6/2001 | Seshia et al. |
| 6,311,555 B1 | | 11/2001 | McCall et al. |
| 6,360,601 B1 | * | 3/2002 | Challoner et al. ....... 73/504.12 |
| 6,370,937 B1 | | 4/2002 | Hsu |
| 6,481,285 B1 | | 11/2002 | Shkel et al. |
| 6,544,655 B1 | | 4/2003 | Cabuz et al. |
| 6,582,985 B1 | | 6/2003 | Cabuz et al. |
| 6,671,648 B1 | | 12/2003 | McCall et al. |
| 6,675,630 B1 | | 1/2004 | Challoner et al. |
| 6,810,737 B1 | * | 11/2004 | Kawai ..................... 73/504.02 |
| 2001/0039834 A1 | | 11/2001 | Hsu |
| 2002/0020219 A1 | | 2/2002 | DeRoo et al. |
| 2002/0178817 A1 | | 12/2002 | Selvakumar et al. |
| 2002/0190607 A1 | | 12/2002 | Paden et al. |
| 2003/0033850 A1 | | 2/2003 | Challoner et al. |

(Continued)

FOREIGN PATENT DOCUMENTS

WO    WO 02/19509    3/2002

OTHER PUBLICATIONS

Gianchandani et al., "Micron-Sized, High Aspect Ratio Bulk Silicon Micromechanical Devices," IEEE Robotics and Automation Society, Micro Electro Mechanical Systems, '92, Travemunde Germany, Feb. 4-7, 1992 pp. 208-213.

(Continued)

*Primary Examiner*—Helen Kwok
(74) *Attorney, Agent, or Firm*—Honeywell International; Crompton Seager Tufte

(57) ABSTRACT

Devices and methods for reducing rate bias errors and scale factor errors in a MEMS gyroscope are disclosed. A MEMS actuator device in accordance with an illustrative embodiment of the present invention can include at least one substrate including one or more horizontal drive electrodes, and a movable electrode spaced vertically from and adjacent to the one or more horizontal drive electrodes. The horizontal drive electrodes and/or movable electrode can be configured to eliminate or reduce rate bias and scale factor errors resulting from the displacement of the movable electrode in the direction of a sense axis of the device.

70 Claims, 6 Drawing Sheets

U.S. PATENT DOCUMENTS

2003/0084722 A1 5/2003 Kim et al.
2003/0133196 A1 7/2003 Wine et al.
2003/0167842 A1 9/2003 Platt
2003/0200803 A1 10/2003 Platt
2003/0200804 A1 10/2003 Johnson
2003/0216884 A1 11/2003 Cardarelli

OTHER PUBLICATIONS

Gianchandani et al., "Silicon Micromachined Thermal Profilers," IEEE Electron Devices Society, International Electron Devices Meeting, Washington, DC, Dec. 5-8, 1993, pp. 8.5.1-8.5.4.

Gianchandani et al., "A Bulk Silicon Dissolved Wafer Process For Microelectromechanical Systems," International Electron Devices Meeting, Washington, DC, Dec. 8-11, 1991, pp. 29.5.1-29.5.4.

Gianchandani et al., "A Bulk Silicon Dissolved Wafer Process for Microelectromechanical Devices," Journal of Microelectromechanical Systems, vol. 1, No. 2, Jun. 1992, pp. 77-85.

Lee, Y.H., et al., "Feature-Size Dependence of Etch Rate in Reactive Ion Etching," Journal of Electromechanical Society, vol. 138, No. 8, Aug. 1991, pp. 2439-2445.

* cited by examiner

MEMS GYROSCOPE WITH HORIZONTALLY ORIENTED DRIVE ELECTRODES

GOVERNMENT SUPPORT

This invention was made with government support under DAAE contract number 30-01-9-0100. The government may have certain rights in the invention.

FIELD

The present invention relates generally to the field of semiconductor manufacturing and microelectromechanical systems (MEMS). More specifically, the present invention relates to methods for reducing rate bias errors and scale factor errors in MEMS devices using drive electrodes having a horizontal orientation.

BACKGROUND

Out-of-plane MEMS gyroscopes (OPG's) are used to determine angular rotation by measuring Coriolis forces exerted on a resonating proof mass. A typical out-of-plane MEMS gyroscope includes two silicon proof masses mechanically coupled to a substrate, typically glass, using one or more silicon suspension springs. A number of recesses etched into the substrate allow selective portions of the silicon structure to move back and forth freely within an interior portion of the device. In certain designs, substrates can be provided above and below the silicon structure to sandwich the proof masses between the two substrates. A pattern of metal traces formed on the substrate(s) can be used to deliver various electrical bias voltages and signal outputs to the device.

The drive system for many MEMS gyroscopes typically includes a number of drive elements that cause the proof mass to oscillate back and forth along a drive axis perpendicular to the direction in which Coriolis forces are sensed. In certain designs, for example, the drive elements may include a number of interdigitated vertical comb fingers configured to convert electrical energy into mechanical energy using electrostatic actuation. Such drive elements are described, for example, in U.S. Pat. No. 5,025,346 to Tang et al., which is incorporated herein by reference in its entirety. In an out-of-plane MEMS gyroscope, these interdigitated comb fingers can produce a large bias, or false angular rate output signal. This bias can be caused by the large electric field in the gap between adjacent comb fingers, and from the fact that the electric field is directed along the sense axis of the gyroscope (i.e. the axis along which the Coriolis force acts). Thus, a force is produced along the sense axis when the movable comb fingers are not perfectly centered between the adjacent stationary comb fingers. This force produces a displacement of the gyroscope proof mass along the sense axis, which is indistinguishable from the displacement along the sense axis produced by the Coriolis force in the presence of angular rotation of the gyroscope. Forces produced by the interdigitated drive comb fingers along the sense axis can also change the capacitance of the sense comb electrodes used to detect the displacement produced by the Coriolis force, thus changing the output signal of the gyroscope. As a result, an error is produced in the scale factor, defined as the gyroscope output signal per unit rotation rate.

SUMMARY

The present invention pertains to MEMS actuator devices having drive electrodes with a horizontal orientation, and to methods for reducing rate bias errors and/or scale factor errors in MEMS gyroscopes. A MEMS actuator device in accordance with an illustrative embodiment of the present invention can include at least one substrate including one or more drive electrodes having a horizontal orientation (hereinafter referred to as "horizontal drive electrodes"), and a movable electrode spaced vertically from and adjacent to the one or more horizontal drive electrodes. In an out-of-plane MEMS gyroscope or other inertial sensing device, the movable electrodes can be coupled to or formed integrally with a proof mass that can be used to sense Coriolis forces produced by movement of the gyroscope about an input or rate axis. In certain embodiments, the proof mass can be sandwiched between a lower substrate including one or more lower horizontal drive electrodes, and an upper substrate including one or more upper horizontal drive electrodes. In other embodiments, the proof mass can be positioned vertically adjacent a single substrate (e.g. a lower or upper substrate) including one or more horizontal drive electrodes. In either embodiment, a motor drive voltage can be applied to the one or more horizontal drive electrodes, causing the proof mass to oscillate back and forth along a motor drive axis perpendicular to a sense axis of the device.

The horizontal drive electrodes and/or proof mass can be configured to eliminate or reduce rate bias errors and/or scale factor errors resulting from static and dynamic displacement of the proof mass in the direction of the sense axis. In certain embodiments, for example, the horizontal drive electrodes can be made wider in the direction of the sense axis than a corresponding portion of the proof mass so that small displacements of the proof mass along the sense axis do not change the electrostatic energy of the system, and hence do not induce electrostatic forces in the direction of the sense axis. Alternatively, forces along the sense axis can be eliminated by making the width of a corresponding portion of the proof mass greater than that of the horizontal drive electrode. The horizontal orientation of the drive electrodes as well as other features described herein can be used to more precisely orient the forces in a variety of MEMS devices employing electrostatic actuators.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized. Moreover, while the various drawings illustrated are described with respect to out-of-plane MEMS gyroscopes, it should be understood that the various devices and methods herein could be used in other MEMS devices employing electrostatic actuators.

Figure 1:
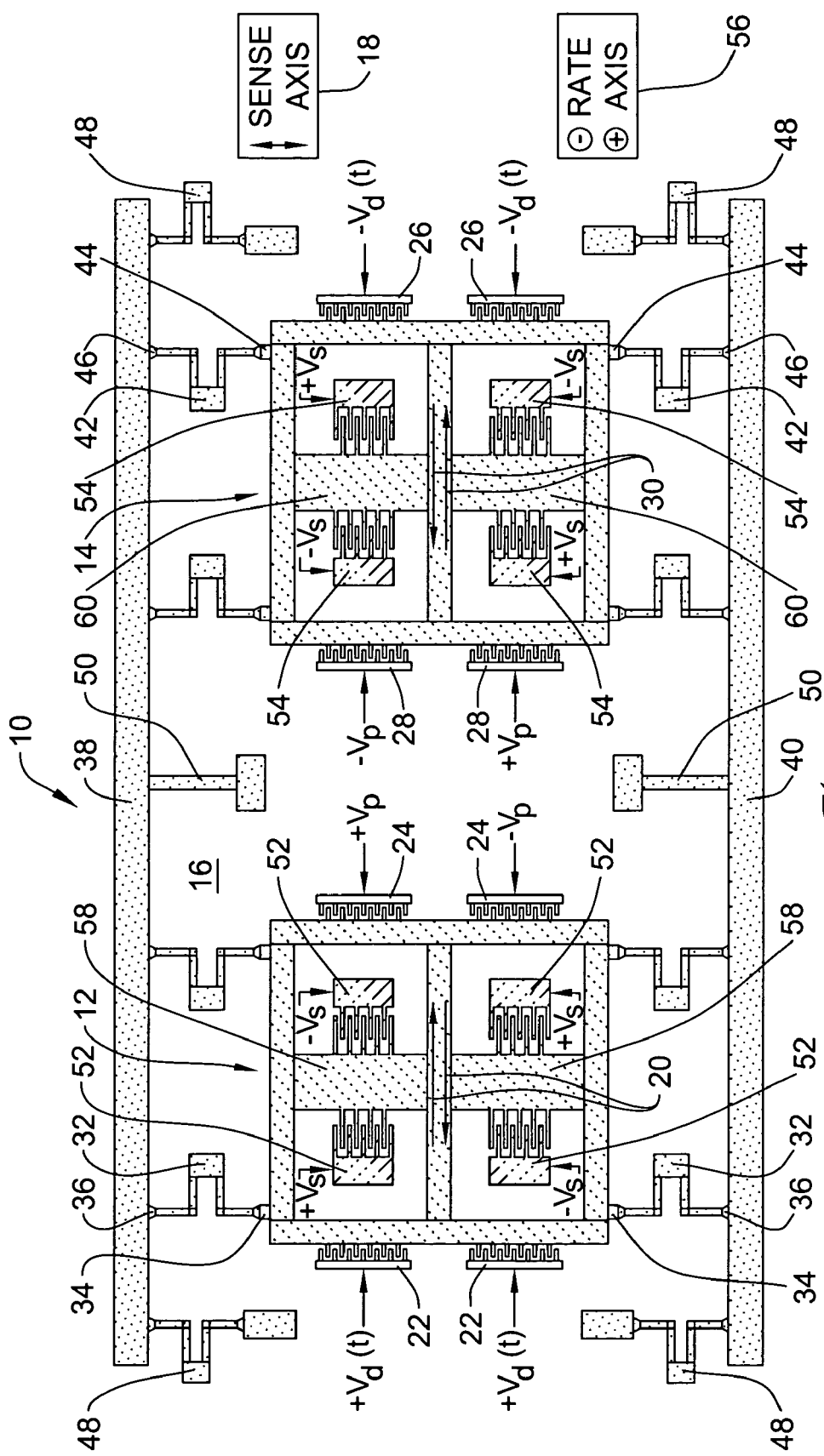
FIG. 1 is a top schematic view of an illustrative out-of-plane MEMS gyroscope employing a number of vertical comb drive elements.

Referring now to FIG. 1, an illustrative prior-art out-of-plane MEMS gyroscope 10 employing a number of vertical comb drive elements will now be described. Gyroscope 10, illustratively a vibratory-type rate gyroscope, includes a first proof mass 12 and a second proof mass 14, each adapted to oscillate back and forth above a lower substrate 16 along an axis perpendicular a sense axis 18 of the gyroscope 10. The first and second proof masses 12,14 can be formed from a silicon structure bonded to the lower substrate 16, which can include a number of recesses and/or mesas that permit selective portions of the silicon structure to move.

In certain designs, gyroscope 10 may further include an upper substrate (not shown) formed over the top of the fabricated silicon structure. As with the lower substrate 16, the upper substrate can include a number of recesses and/or mesas that permit the proof masses to move within an interior portion of the gyroscope 10. When employed, the lower substrate 16 and upper substrate can form a sandwiched structure that can be used to provide enhanced structural and electrical symmetry perpendicular to the plane of the two substrates, if desired.

As indicated generally by the right/left set of arrows 20, the first proof mass 12 can be configured to oscillate back and forth between a first set of drive electrodes 22 and a first set of motor pickoff combs 24, both of which can be configured to remain stationary above the lower substrate 16. In similar fashion, the second proof mass 14 can be configured to oscillate back and forth above the lower substrate 16 between a second set of drive electrodes 26 and a second set of motor pickoff combs 28, but 180° out-of-phase with the first proof mass 12, as indicated generally by the left/right set of arrows 30.

The first and second proof masses 12,14 can be mechanically coupled to the lower substrate 16 using one or more suspension springs that act to constrain motion of the first and second proof masses 12,14 along a motor drive axis indicated by arrows 20 and 30. As shown in FIG. 1, for example, the first proof mass 12 can be anchored or otherwise coupled to the lower substrate 16 using a first set of four suspension springs 32 each connected at a first end 34 thereof to the first proof mass 12 and at a second end 36 thereof to a number of silicon cross-beams 38,40. In similar fashion, the second proof mass 14 can be anchored or otherwise coupled to the lower substrate 16 using a second set of four suspension springs 42 each connected at a first end 44 thereof to the second proof mass 14 and at a second end 46 thereof to the first and second silicon cross-beams 38,40. The first and second silicon cross-beams 38,40, in turn, can be coupled to the lower substrate 16 via a number of suspension springs 48 and support members 50, which can be used to further constrain oscillatory drive movement of the first and second proof masses 12,14 along an axis perpendicular to the direction of the sense axis 18.

The drive system for gyroscope 10 can include a number of interdigitated drive comb fingers that can be used to electrostatically drive the proof masses 12,14 in the direction indicated generally by arrows 20 and 30. In the illustrative gyroscope 10 depicted in FIG. 1, for example, the first set of comb drive electrodes 22 can each include a number of vertical comb fingers interdigitated with a number of vertical comb fingers coupled to the first proof mass 12. The second set of comb drive electrodes 26, in turn, can each include a number of vertical comb fingers interdigitated with a number of comb fingers coupled to the second proof mass 14. While each of the comb drive electrodes 22,26 illustrative in FIG. 1 are shown having seven comb drive fingers apiece, it should be understood that a greater or lesser number of comb drive fingers can be employed, if desired.

A motor drive voltage $V_d(t)$ can be applied to the first and second set of drive electrodes 22,26, inducing an electrostatic force within the gap between each adjacent interdigitated comb finger that causes the comb fingers to move with respect to each other. The motor drive voltage $V_d(t)$ can be configured to output a time-varying voltage signal to alternative the charge delivered to the comb drive electrodes 22,26, which in conjunction with the suspension springs 32,42, causes the first and second proof masses 12,14 to oscillate back and forth above the lower substrate 16. Typically, the motor drive voltage $V_d(t)$ will produce an electrostatic force at the resonant frequency of the motor mode of the first and second proof masses 12,14, although other desired frequencies can be employed, if desired. The motor mode resonant motion of the proof masses 12,14 includes motion of the two proof masses 12,14 in opposing directions along the motor drive axis indicated by arrows 20,30 in FIG. 1.

To detect and measure displacement of the proof masses 12,14, a number of motor pickoff combs 24,28 can be further provided opposite each of the comb drive electrodes 22,26. As with the comb drive electrodes 22,26, each of the motor pickoff combs 24,28 can include a number of comb fingers interdigitated with a number of comb fingers coupled to the respective proof mass 12,14. In use, a DC motor pickoff bias voltage VP can be applied to each of the motor pickoff combs 24,28 to obtain a measure of proof mass displacement by measuring changes in electrostatic charge induced by relative displacement of the interdigitated comb fingers.

A first and second set of sense combs 52,54 can be provided as a part of the sensing system to detect and measure displacement of the first and second proof masses 12,14 in the direction of the sense axis 18 as a result of gyroscopic movement about an input or rate axis 56. As shown in FIG. 1, each set of sense combs 52,54 can include a number of inwardly directed comb fingers interdigitated with a number of outwardly directed comb fingers coupled to a portion 58,60 of each respective proof mass 12,14. The sense combs 52,54 can be configured so that small displacements of the proof masses 12,14 along the sense axis 18 produce a change in capacitance between the interdigitated comb fingers. This capacitance change, combined with a sense bias voltage $V_s$ applied to each set of sense combs 52,54, allows sensing of movement of the proof masses 12,14 along the sense axis 18. In certain designs, the polarity of the sense bias voltage $V_s$ applied to each set of sense combs 52,54 can be reversed or alternated between adjacent sets of sense combs 52,54 to prevent the sense bias voltage $V_s$ from producing a current that could masquerade as a rate signal.

During operation, the angular rotation of the gyroscope 10 in conjunction with the motor motion of the proof masses 12,14 produces a Coriolis force perpendicular to the rate axis 56 and motor drive axis 20,30, and parallel with the direction of the sense axis 18. These Coriolis forces produce motion of the proof masses 12,14 along the sense axis 18, which can then be sensed by detecting and measuring charge signals or currents induced on sense combs 52,54 resulting from movement of the interdigitated comb fingers along the sense axis 18. The resulting sense signal can then be fed to a charge amplifier and/or other sensing circuitry that can used to convert the charge signals or currents sensed into a rate signal indicative of the Coriolis force.

If the proof masses 12,14 are misaligned with the comb drive fingers coupled to the comb drive electrodes 22,26, a rate bias error or scale factor error may occur in which electric fields oriented primarily along the sense axis 18 of the gyroscope 10 produce forces on the proof masses 12,14 along the sense axis 18. The rate bias error or scale factor error produced by these forces can be substantial in those cases where the motor drive voltages applied to the comb drive electrodes 22,26 are significant (e.g. several volts or higher), and/or where the gap between each adjacent interdigitated comb finger is small (e.g. 2 to 3 um).

The cause of the sense axis forces produced from misalignment of the comb drive fingers can be understood as follows. The general expression for the electrostatic force produced by the drive electrodes along the sense axis is:

$$F_y(y, t) = \frac{1}{2}\frac{\partial C_d}{\partial y}V_d(t)^2 \quad (1)$$

Equation (1) above applies to vertical and horizontal drive electrodes. In equation (1), $F_y$ is the electrostatic force along the sense axis produced by the drive electrode(s), $C_d$ is the capacitance between the stationary drive electrode(s) and the movable electrode, $y(t)$ is the displacement of the movable electrode along the sense axis relative to its ideal static position, and $V_d(t)$ is the voltage difference applied between the drive electrode(s) and the movable electrode.

For small $y(t)$, equation (1) can be approximated as:

$$F_y(y, t) \approx \frac{1}{2}\left(\frac{\partial C_d}{\partial y}\bigg|_{y=0} + \frac{\partial^2 C_d}{\partial y^2}\bigg|_{y=0} y(t)\right)V_d(t)^2 \quad (2)$$

Equation (2) is a good approximation for a typical MEMS gyroscope. In equation (2), $y=0$ refers to the ideal static position of the movable electrode. When $y=0$, the position of the movable electrode typically has a high degree of symmetry relative to the position of the stationary drive electrode(s) so that $\partial C_d/\partial y|_{y=0}$ is zero. Misalignment of the movable and stationary electrodes is represented by a non-zero value of $y(t)$. It can be seen from equation (2) that a non-zero $y(t)$ combined with non-zero $\partial^2 C_d/\partial y^2|_{y=0}$ will produce a force along the sense axis. For vertical comb drive electrodes in an out-of-plane MEMS gyroscope, $\partial^2 C_d/\partial y^2|_{y=0}$ is quite large due to the small gaps between the interdigitated comb fingers and the resulting large electric fields pointing along the sense axis. Thus, according to equation (2), a small displacement $y(t)$ can produce a significant force $F_y$ along the sense axis in those instances where drive combs having a vertical orientation are used.

The comb drive electrodes can produce rate bias by either a static sense axis displacement of the comb drive fingers, or by a dynamic sense axis displacement of the drive comb fingers varying at the motor frequency. A typical out-of-plane MEMS gyroscope is designed so that only the differential sense axis displacement between the two proof masses contributes to rate bias. This differential displacement is referred to as sense mode displacement. The static component of sense mode displacement arises from static forces applied to the sense mode. These static forces can arise from package stress, thermal expansion mismatches, silicon suspension spring mismatches, or other effects unrelated to the motor drive voltage $V_d(t)$.

The dynamic component of sense mode displacement consists of mostly what is known in the art as quadrature motion. Quadrature motion is at the motor frequency and is 90° out-of-phase with the sense mode displacement produced by the Coriolis forces. Such motion typically arises from the motor drive force along the motor drive axis, combined with silicon suspension spring stiffness mismatches, misalignment of the motor drive forces, etc.

To reduce the undesired rate bias due to quadrature motion, many prior-art gyroscopes employ complicated error-correction methods. In one such method described in U.S. Pat. No. 6,067,858 to Clark et al., for example, a quadrature force rebalance technique is employed which uses additional electrodes to provide electrostatic forces that null out the quadrature motion. While such methods can be used to reduce the dynamic sense mode motion of the proof masses, such techniques do not eliminate the underlying rate bias due to static sense axis displacement of the proof masses. As a result, many out-of-plane MEMS gyroscopes are limited in their ability to detect and/or measure subtle changes in motion.

Figure 2:
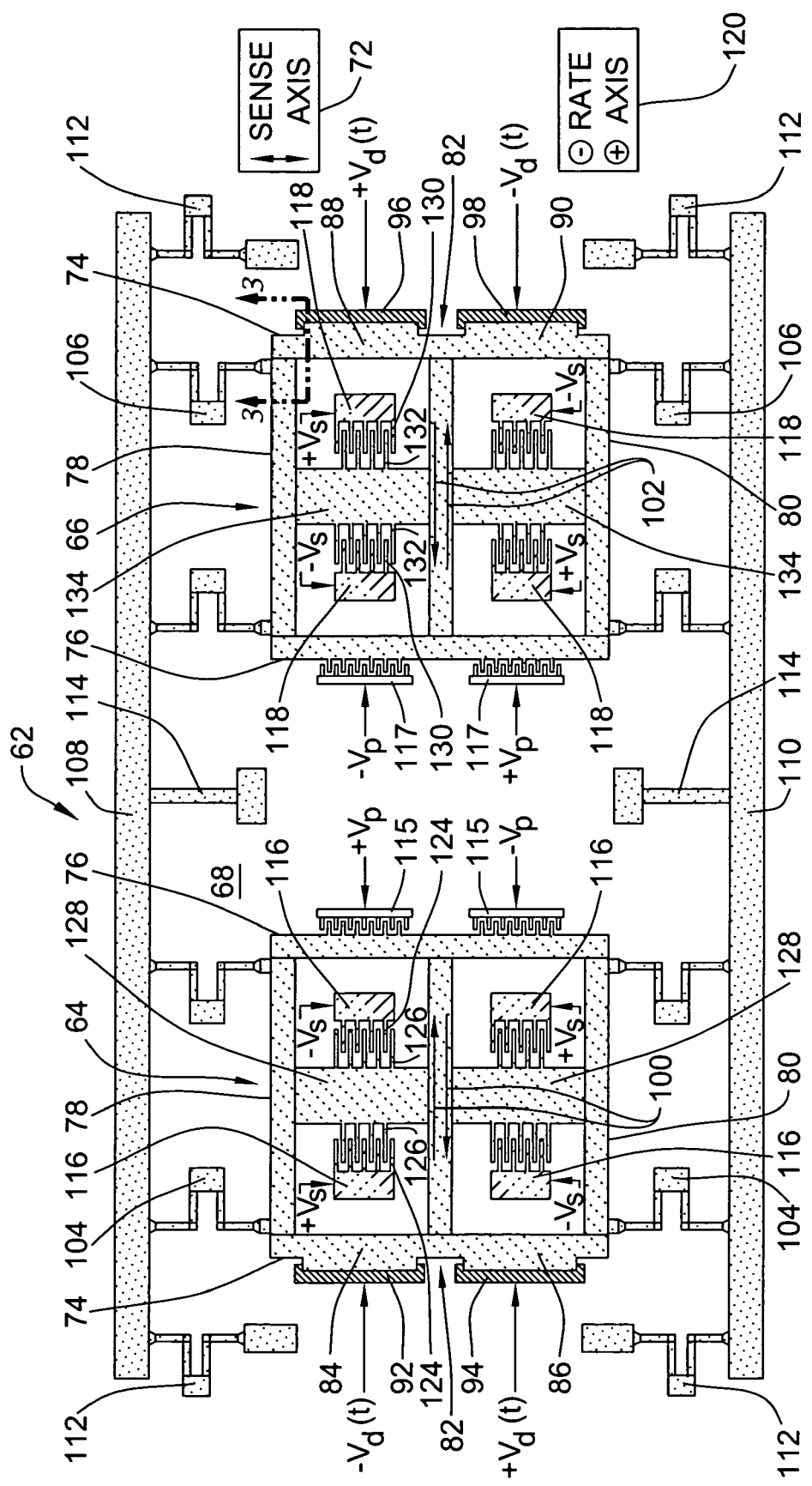
FIG. 2 is a top schematic view of a MEMS gyroscope employing a MEMS actuator device in accordance with an illustrative embodiment of the present invention.

Turning now to FIG. 2, a top schematic view of an out-of-plane MEMS gyroscope 62 employing a MEMS actuator device in accordance with an illustrative embodiment of the present invention will now be described. Gyroscope 62, illustratively a vibratory-type rate gyroscope, includes a first proof mass 64 and second proof mass 66 each adapted to oscillate back and forth horizontally in between a lower substrate 68 and an upper substrate 70 (see FIG. 3) in a drive plane perpendicular to a sense axis 72 of the gyroscope 62. In the particular view depicted in FIG. 2, the upper substrate 70 is shown removed to reveal the internal structure of the gyroscope 62 in greater detail. Thus, while various elements are described below with respect to only the lower substrate 68, it should be understood that the upper substrate 70 may also include one or more of the elements described herein, if desired.

Each proof mass 64,66 can be formed from a substantially planar structure each having first and second opposing ends 74,76, and first and second opposing sides 78,80. In the illustrative embodiment of FIG. 2, each proof mass 64,66 can include an inwardly directed notch 82 formed at each respective end 74, forming a number of drive tines 84,86 of the first proof mass 64 and a number of drive tines 88,90 of the second proof mass 66. The proof masses 64,66 can be formed from silicon or other suitable material using semiconductor fabrication techniques well known to those in the art such as photolithography and reactive ion etching.

As can be further seen in FIG. 2, the gyroscope 62 can further include a number of horizontal drive electrodes 92,94,96,98 that can be used to oscillate the proof masses 64,66 back and forth 180° out-of-phase with each other along a motor drive axis indicated generally by arrows 100 and 102. In the illustrative embodiment of FIG. 2, the horizontal drive electrodes 92,94,96,98 are oriented in a substantially horizontal direction planar with the lower and upper substrates 68,70 of the gyroscope 62.

The horizontal drive electrodes 92,94,96,98 can be configured to remain stationary on the surface of the lower substrate 68, or within the substrate 68, and can be made wider in the direction of the sense axis 72 than a corresponding width of the respective drive tine 84,86,88,90 such that small displacements of the proof masses 64,66 along the sense axis 72 do not result in a concomitant change in drive capacitance, thus resulting in no force component along the sense axis. Such configuration can be used, for example, to eliminate or reduce rate bias resulting from the displacement of each proof mass 64,66 in the direction of the sense axis 72, as understood vis-à-vis equation (1) above. While two horizontal drive electrodes 92,94 and 96,98 are specifically depicted in the illustrative embodiment of FIG. 2, other embodiments have been envisioned wherein a greater or lesser number of horizontal drive electrodes are employed.

A time-varying motor drive voltage $V_d(t)$ can be applied to each set of the horizontal drive electrodes 92,94 and 96,98 relative to the voltage on each respective proof mass 64,66, inducing an electrostatic force between the drive tines 84,86,88,90 and corresponding horizontal drive electrodes 92,94,96,98 that causes the proof masses 64,66 to oscillate back and forth above the lower substrate 68 along the motor drive axis. At a nominal position prior to starting the motor motion of the gyroscope 10 illustrated in FIG. 2, the drive tines 84,86,88,90 can be configured to overlap a portion of the horizontal drive electrode 92,94,96,98 surface. Once activated, or at different times during the actuation cycle, the proof masses 64,66 can be configured to oscillate back and forth in a manner similar that described above with respect to FIG. 1. If desired, a set of suspension springs 104,106 similar to that depicted in FIG. 1 can be utilized to further constrain movement of the proof masses 64,66, providing a restorative force as each proof mass 64,66 passes through zero. Other elements such as the cross-beams 108,110, suspension springs 112, and support members 114 depicted in FIG. 2 can be further provided, if desired. In certain embodiments, the motor drive voltage $V_d(t)$ can have a frequency that produces a force at the motor resonant frequency of the proof masses 64,66, although other frequencies can be employed, if desired.

In the illustrative embodiment of FIG. 2, the horizontal drive electrodes 92,94,96,98 are shown having a split configuration, forming two separate sets of split drive electrodes 92,96 and 96,98 each being electrically isolated from each other. To prevent the motor drive voltage $V_d(t)$ from injecting current into the angular rate sensing electronics, the polarities of the motor drive voltages $V_d(t)$ applied to the horizontal drive electrodes 92,94,96,98 can be reversed. As shown in FIG. 2, for example, a negative motor drive voltage signal $^-V_d(t)$ can be applied to the upper-left horizontal drive electrode 92 of the first proof mass 64 whereas a positive motor drive voltage $^+V_d(t)$ can be applied to the lower-left horizontal drive electrode 94 of the first proof mass 64. In similar fashion, a positive motor drive voltage signal $^+V_d(t)$ can be applied to the upper-right horizontal drive electrode 96 of the second proof mass 66 whereas a negative motor drive voltage $^-V_d(t)$ can be applied to the lower-right horizontal drive electrode 98 of the second proof mass 66. By reversing the polarity to each horizontal drive electrode 92,94,96,98 in this manner, a net zero charge may be provided on the proof masses 64,66, preventing the applied motor drive voltages $V_d(t)$ from injecting current into the angular rate sensing electronics. It should be understood, however, that other configurations are possible.

To detect and measure displacement of the proof mass 64,66, a number of motor pickoff combs 115,117 can be further provided opposite each of the horizontal drive electrodes 92,94,96,98. As with the motor pickoff combs 24,28 described above with respect to FIG. 1, each of the motor pickoff combs 115,117 can include a number of comb fingers interdigitated with a number of comb fingers coupled to the respective proof mass 64,66. In use, a DC motor pickoff bias voltage $V_p$ can be applied to each of the motor pickoff combs 115,117 to obtain a measure of proof mass displacement by measuring changes in electrostatic charge induced by relative displacement of the interdigitated comb fingers. In certain embodiments, the polarities of the motor pickoff bias voltage $V_p$ applied to each motor pickoff comb 115,117 can be reversed, if desired.

A set of sense comb anchors 116,118 disposed within an interior portion of each respective proof mass 64,66 can be provided as part of the sensing system to detect and/or measure deflection of the proof masses 64,66 in the direction of the sense axis 72 as a result of gyroscopic movement about an input or rate axis 120. In certain embodiments, the sense comb anchors 116,118 can be formed over a layer of grounding metal 122 (see FIG. 3) disposed on the lower substrate 68, which can be either hard-ground to the device or held at a virtual ground, as desired. A first number of comb fingers 124 extending outwardly from sense comb anchor 116 can be interdigitated with a first number of comb fingers 126 extending inwardly from a portion 128 of the first proof mass 64. In similar fashion, a second number of comb fingers 130 extending outwardly from sense comb anchor 118 can be interdigitated with a second number of comb fingers 132 extending inwardly from a portion 134 of the second proof mass 66. In the illustrative embodiment of FIG. 2, the sense comb fingers 124,126 and 130,132 can be offset from each other on each sense comb anchor 116,118 such that motion of the proof masses 64,66 along the sense axis 72 produces a change in capacitance between the sense comb anchor 116,118 and corresponding proof mass 64,66. While the illustrative sense comb anchors 116,118 depicted in FIG. 2 each include eight comb fingers apiece with four fingers disposed on each side of portions 128 and 134, it should be understood that a different number and/or arrangement of sense comb fingers can be utilized, if desired.

A sense bias voltage $V_s$ can be applied to each of the sense comb anchors 116,118 and/or the proof masses 64,66 to sense relative movement of the interdigitated comb fingers 124,126 and 130,132 along the sense axis 72, perpendicular to the direction of motor motion. In certain embodiments, the sense comb anchors 116,118 may each have a split configuration, with the polarity of the sense bias voltage $V_s$ applied to each split member being reversed or offset in some desired manner to prevent the sense bias voltage $V_s$ signal from being injected into the desired rate signal. In use, the proof mass motion produced by the Coriolis force can be sensed by measuring the current induced on the sense comb anchor 116,118 and/or on the proof masses 64,66 when the sense bias voltage $V_s$ is applied.

While two proof masses 64,66 are depicted in the illustrative embodiment of FIG. 2, it should be understood that the gyroscope 62 can employ a greater or lesser number of proof masses, if desired. In certain embodiments, for example, the gyroscope 62 can include two sets of two proof masses, each set adapted to move back and forth 180° out-of-phase with respect to each other. Moreover, while the various drive elements illustrated herein are shown as part of a MEMS actuator device for use in an out-of-plane MEMS gyroscope, it should be understood that the actuator device could be incorporated into other MEMS devices, including but not limited to, in-plane MEMS gyroscopes, accelerometers, tuning forks, micro-mirrors, or other such devices.

Figure 3:
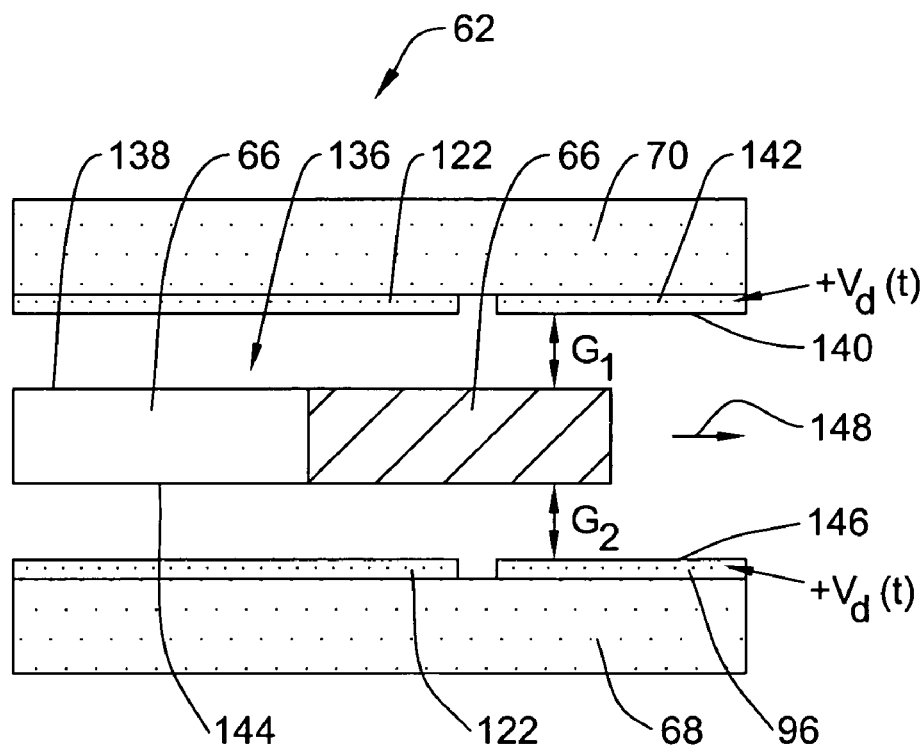
FIG. 3 is a side cross-sectional view showing the illustrative gyroscope along line 3—3 in FIG. 2.

FIG. 3 is a side cross-sectional view showing the illustrative gyroscope 62 along line 3—3 in FIG. 2. As can be seen in FIG. 3, the proof mass 66 can be freely supported between the lower substrate 68 and the upper substrate 70 within an interior portion 136 of the gyroscope 62. An upper surface 138 of the proof mass 66 can be parallel or substantially parallel to a lower surface 140 of an upper horizontal drive electrode 142, forming a first gap $G_1$ above the proof mass 66. In similar fashion, a lower surface 144 of the proof mass 66 can be parallel or substantially parallel to an upper surface 146 of the lower horizontal drive electrode 96, forming a second gap $G_2$ below the proof mass 66. The dimensions of the gaps $G_1, G_2$ can be varied to either increase or decrease the electrostatic forces induced by the motor drive voltage $V_d(t)$, as desired. In certain embodiments, the dimensions of the gaps $G_1, G_2$ may be in the range of 0.5 um to 8 um, and more specifically, 2 um to 4 um, although other dimensions smaller or larger than this can be employed. In at least some embodiments, the proof mass 66 can be centrally positioned between the lower and upper substrates 68,70 such that the dimension of the first gap $G_1$ is similar or equal to the dimension of the second gap $G_2$, although other configurations are possible. A similar configuration can be provided on the other proof mass 64, if desired.

During operation, a motor drive voltage $V_d(t)$ applied to the lower and upper horizontal drive electrodes 96,142 can be configured to induce an electrostatic charge or force between each of the gaps $G_1, G_2$, causing the proof mass 66 to be attracted in a direction of increasing overlap with the lower and upper horizontal drive electrodes 96,142, as indicated generally by arrow 148. Because both lower and upper horizontal drive electrodes 96,142 are utilized, any upward and/or downward forces exerted on the proof mass 66 are effectively cancelled due to the vertical symmetry of the structure. In certain embodiments, the grounding layers 122 can be hard-grounded to the gyroscope 62 while the proof mass 66 can be held at virtual ground. Alternatively, the grounding layers 122 can be held at virtual ground whereas the proof mass 66 can be hard-grounded to the gyroscope 62, if desired. In either embodiment, the grounding of the grounding layers 122 and/or proof mass 66 can be used to facilitate electrostatic actuation of the proof mass 66.

Figure 4:
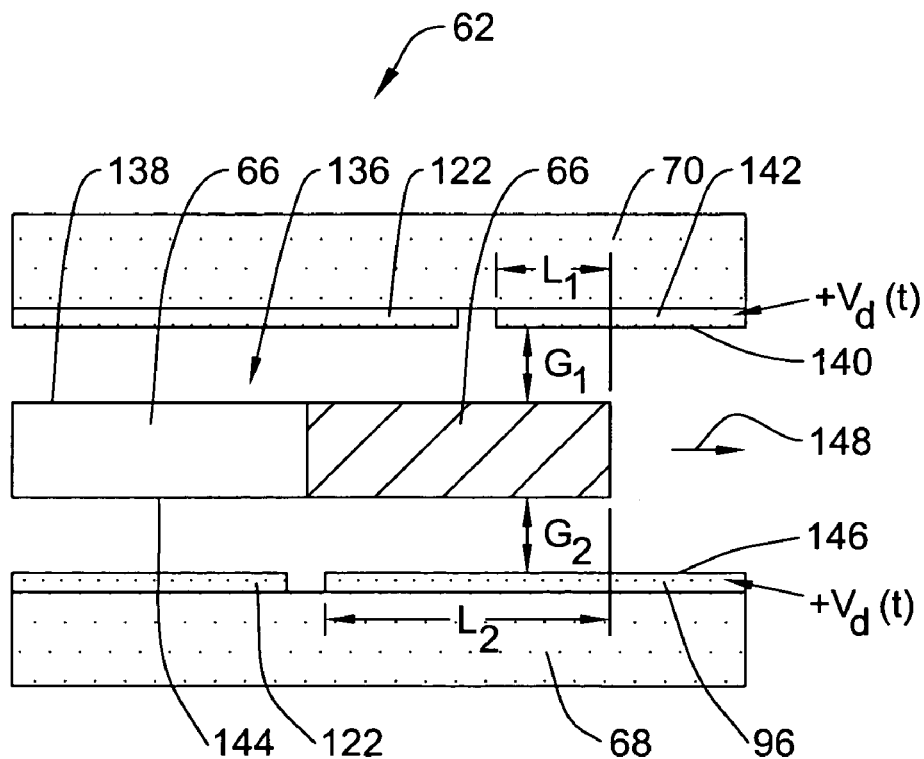
FIG. 4 is a side cross-sectional view showing an alternative MEMS gyroscope having horizontal drive electrodes of differing length.

FIG. 4 is a side cross-sectional view showing the MEMS gyroscope 62 along line 3—3 in FIG. 2, but having horizontal drive electrodes 96,142 of differing length. As can be seen in FIG. 4, the upper drive electrode 142 and proof mass 66 may overlap by a distance $L_1$. In similar fashion, the lower drive electrode 96 and proof mass 66 may overlap by a distance $L_2$. In certain embodiments, and as shown in FIG. 4, the dimension $L_2$ can be made longer than dimension $L_1$ to provide a greater amount of overlap of the lower horizontal drive electrode 96 and proof mass 66 than the upper horizontal drive electrode 142 and proof mass 66. In an alternative embodiment, the dimension $L_1$ can be made longer than dimension $L_2$ to provide a greater amount of overlap of the upper horizontal drive electrode 142 and proof mass 66 than the lower horizontal drive electrode 96 and proof mass 66.

The dimensions $G_1$, $G_2$, $L_1$, and $L_2$ can be adjusted to alter performance of the device in a desired manner. In certain embodiments, for example, the dimensions $G_1$, $G_2$, $L_1$, and $L_2$ can be selected to achieve nearly zero vertical force on the proof mass 66 without degrading the desired force along the motor drive axis. For this purpose, $L_1$ and $L_2$ could be chosen to balance the upward and downward vertical forces on the proof mass 66 in the presence of undesired variations in $G_1$ and $G_2$ arising from residual stresses in the proof mass 66. A similar arrangement can be provided on the other proof mass 64 and/or horizontal drive electrodes 92,94, if desired.

Figure 5:
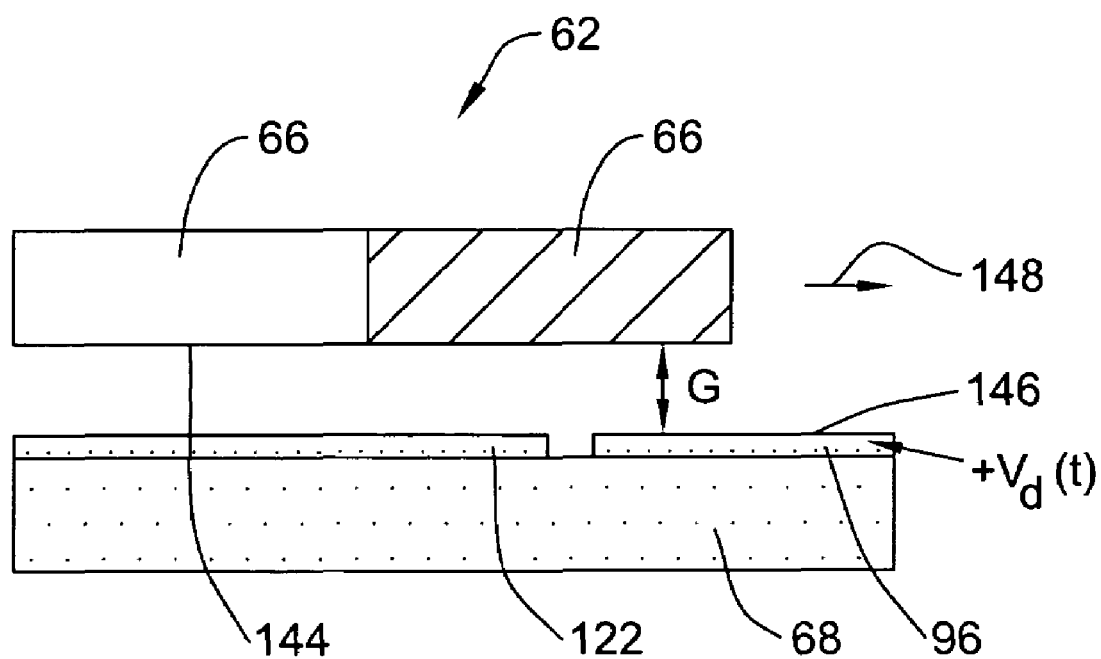
FIG. 5 is a side cross-sectional view showing an alternative MEMS gyroscope having a single substrate structure.

FIG. 5 is a side cross-sectional view showing the illustrative gyroscope 62 along line 3—3 in FIG. 2, but having only a single substrate structure. As can be seen in FIG. 5, the proof mass 66 can be configured to overly only the lower substrate 68 of the gyroscope 62 in a manner similar to that described above with respect to FIG. 3. In certain embodiments, for example, the lower surface 144 of the proof mass 66 can be parallel or substantially parallel with and spaced apart from the upper surface 146 of the lower horizontal drive electrode 96 by a gap G, which in certain illustrative embodiments can be in the range of 0.5 um to 8 um, and more specifically, 2 um to 4 um. While the illustrative embodiment in FIG. 5 shows the removal of the upper substrate structure of the gyroscope 62, it should be understood that a reverse configuration could be employed wherein the lower substrate structure of the gyroscope 62 is removed.

When only a single substrate structure is employed, the motor drive voltage $V_d(t)$ may produce a downward vertical force on the proof mass 66 as the proof mass 66 moves in the direction of arrow 148. The resulting vertical displacement is relatively small, however, since the frequency of the motor drive force is typically different than the resonant mode vertical motion component of the proof mass 66. In contrast, the displacement of the proof mass 66 along the direction 148 is relatively large, as desired, since the motor drive force is typically at the motor resonant frequency.

Figure 6:
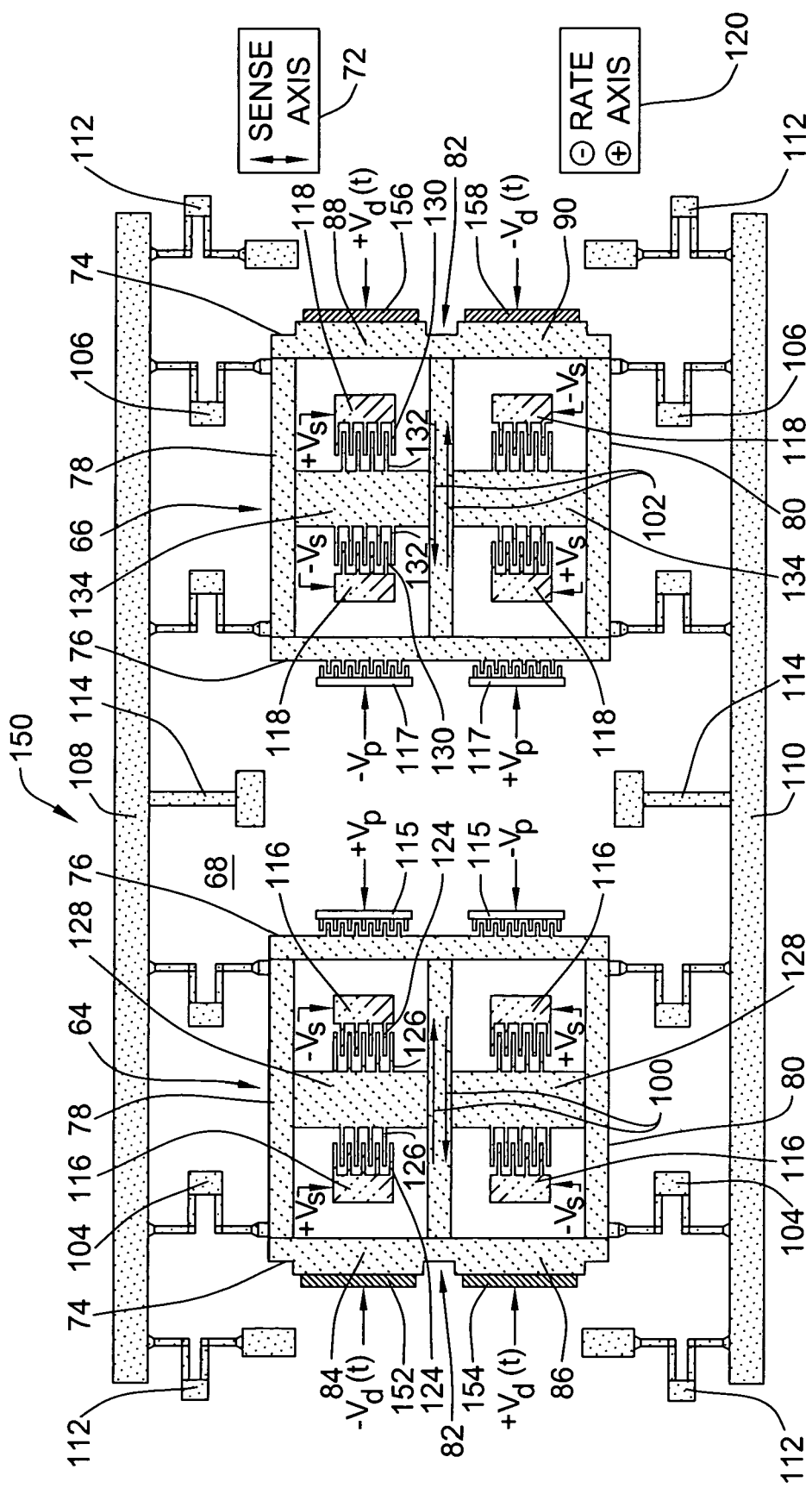
FIG. 6 is a top schematic view of a MEMS gyroscope employing a MEMS actuator device in accordance with another illustrative embodiment of the present invention.

FIG. 6 is a top schematic view of a MEMS gyroscope 150 employing a horizontal drive device in accordance with another illustrative embodiment of the present invention. Gyroscope 150 can be configured similar to gyroscope 62 described above with respect to FIG. 2, with like elements in the different drawings being numbered in like fashion. In the illustrative embodiment depicted in FIG. 6, however, the gyroscope 150 can include a number of split horizontal drive electrodes 152,154,156,158 each having a width in the direction of the sense axis 72 that is less than a respective width of the drive tines 82,84,86,88. As with other embodiments herein, the horizontal drive electrodes 152,154,156, 158 can be configured to remain stationary on the surface of the lower substrate 68, or within the substrate 68, and can be used to oscillate the proof masses 64,66 back and forth along the motor drive axis in a manner similar to that described above with respect to FIG. 2. In use, such configuration can be used, for example, to eliminate or reduce rate bias and/or scale factor errors resulting from the displacement of the proof masses 64,66 in the direction of the sense axis 72.

Figure 7:
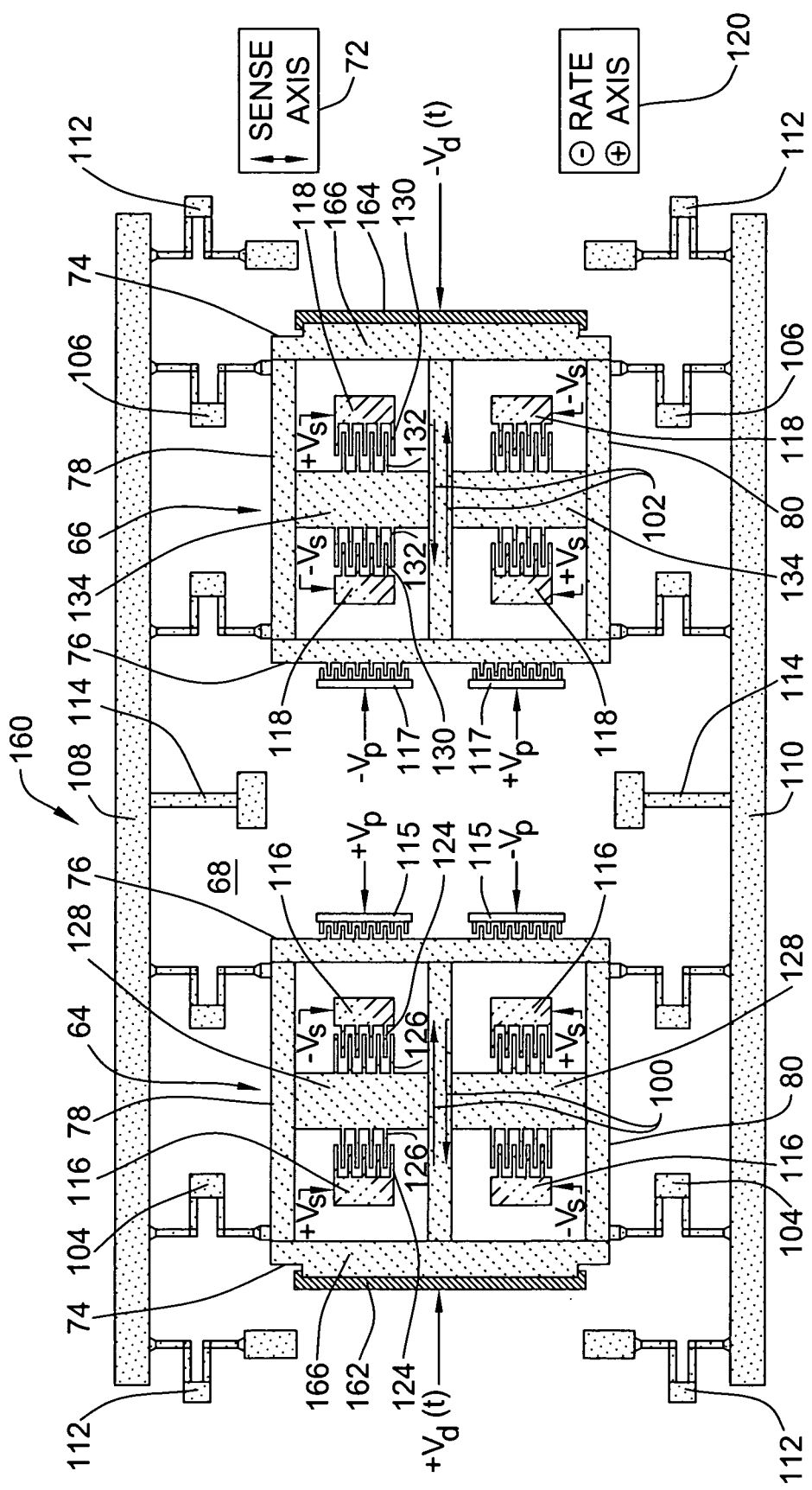
FIG. 7 is a top schematic view of a MEMS gyroscope employing a MEMS actuator device in accordance with another illustrative embodiment of the present invention.

FIG. 7 is a top schematic view of a MEMS gyroscope 160 employing a horizontal drive device in accordance with another illustrative embodiment of the present invention employing a single horizontal drive electrode structure. Gyroscope 160 can be configured similar to gyroscope 62 described above with respect to FIG. 2, with like elements in the different drawings being numbered in like fashion. In the illustrative embodiment depicted in FIG. 7, however, a single horizontal drive electrode 162,164 can be provided adjacent each respective proof mass 64,66 to oscillate the proof masses back and forth in between the lower substrate 68 and/or upper substrate 70. Each proof mass 64,66 can include a single drive tine 166,168 that can be configured to overlap a portion of the horizontal drive electrode 162,164. In certain embodiments, the horizontal drive electrodes 162,164 and/or drive tines 166,168 can have a substantially rectangular shape, although other configurations are possible.

As with other embodiments herein, the first and second horizontal drive electrodes 162,164 can be configured to remain stationary above the lower substrate 68, and can be made wider in the direction of the sense axis 72 than a corresponding width of each respective drive tine 166,168 to eliminate or reduce rate bias errors and/or scale factor errors resulting from displacement of the proof mass 64,66 in the direction of the sense axis 72, if any. Alternatively, the same effect can be achieved by making the horizontal drive electrodes 162,164 narrower in the direction of the sense axis 72 than the width of the corresponding drive tines 166,168.

A time-varying motor drive voltage $V_d(t)$ can be applied to each horizontal drive electrodes 162,164, inducing an electrostatic force between an overlapping portion of each proof mass 64,66 that causes the proof masses 64,66 to oscillate back and forth above the lower substrate 68. To prevent the motor drive voltage $V_d(t)$ from being injected into the sense system, the polarity of the motor drive voltage $V_d(t)$ signal applied to each horizontal drive electrode 162, 164 can be reversed or offset. As shown in FIG. 7, for example, a positive motor drive voltage $^+V_d(t)$ signal can be applied to the horizontal drive electrode 162 used to drive the first proof mass 64 whereas a negative motor drive voltage $^-V_d(t)$ can be applied to the horizontal drive electrode 164 used to drive the second proof mass 66. A reverse configuration could also be employed, if desired.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A MEMS actuator device, comprising:
   at least one substrate including one or more horizontal drive electrodes; and
   a movable electrode spaced vertically from and adjacent to the one or more horizontal drive electrodes, said movable electrode adapted to oscillate back and forth horizontally along a motor drive axis of the actuator device.

2. The MEMS actuator device of claim 1, wherein said at least one substrate comprises a lower substrate.

3. The MEMS actuator device of claim 1, wherein said at least one substrate comprises an upper substrate.

4. The MEMS actuator device of claim 1, wherein said at least one substrate comprises a lower substrate and an upper substrate.

5. The MEMS actuator device of claim 4, wherein said one or more horizontal drive electrodes comprises:
   a lower horizontal drive electrode coupled to the lower substrate; and
   an upper horizontal drive electrode coupled to the upper substrate.

6. The MEMS actuator device of claim 5, wherein the movable electrode comprises a planar structure having an upper surface and a lower surface.

7. The MEMS actuator device of claim 6, wherein the lower surface of the movable electrode extends parallel or substantially parallel to an upper surface of the lower horizontal drive electrode.

8. The MEMS actuator device of claim 6, wherein the upper surface of the movable electrode extends parallel to or substantially parallel to a lower surface of the upper horizontal drive electrode.

9. The MEMS actuator device of claim 5, wherein the lower horizontal drive electrode and upper horizontal drive electrode each define a length, and wherein the length of the upper horizontal drive electrode is different than the length of the lower horizontal drive electrode.

10. The MEMS actuator device of claim 5, wherein the lower horizontal drive electrode and upper horizontal drive electrode each define a length, and wherein the length of the upper horizontal drive electrode is similar or equal to the length of the second horizontal drive electrode.

11. The MEMS actuator device of claim 1, wherein the movable electrode comprises a proof mass having one or more drive tines.

12. The MEMS actuator device of claim 11, wherein each of the one or more horizontal drive electrodes defines a width along the direction of a sense axis parallel to the at least one substrate, and wherein said width is greater than a corresponding width of each respective drive tine.

13. The MEMS actuator device of claim 11, wherein each of the one or more horizontal drive electrodes defines a width along the direction of a sense axis parallel to the at least one substrate, and wherein said width is less than a corresponding width of each respective drive tine.

14. The MEMS actuator device of claim 1, wherein each of the one or more horizontal drive electrodes includes a number of split horizontal drive electrodes.

15. The MEMS actuator device of claim 1, wherein each of the one or more horizontal drive electrodes includes a single horizontal drive electrode.

16. The MEMS actuator device of claim 1, further comprising a motor drive voltage source for inducing a charge on the one or more horizontal drive electrodes.

17. The MEMS actuator device of claim 1, further comprising sensing means for sensing motion of the movable electrode along a sense axis parallel to the at least one substrate.

18. The MEMS actuator device of claim 1, further comprising means for coupling the movable electrode to the at least one substrate.

19. The MEMS actuator device of claim 18, wherein said means for coupling the movable electrode to the at least one substrate includes one or more suspension springs.

20. A MEMS actuator device, comprising:
   a lower substrate including at least one lower horizontal drive electrode;
   an upper substrate including at least one upper horizontal drive electrode; and
   a movable proof mass adapted to oscillate back and forth horizontally within an interior space of the upper and lower substrates vertically adjacent to the at least one lower and upper horizontal drive electrodes.

21. The MEMS actuator device of claim 20, wherein the movable proof mass comprises a planar structure having an upper surface and a lower surface.

22. The MEMS actuator device of claim 21, wherein the lower surface of the movable proof mass extends parallel or substantially parallel to an upper surface of the lower horizontal drive electrode.

23. The MEMS actuator device of claim 21, wherein the upper surface of the proof mass extends parallel to or substantially parallel to a lower surface of the upper horizontal drive electrode.

24. The MEMS actuator device of claim 20, wherein the lower horizontal drive electrode and upper horizontal drive electrode each define a length, and wherein the length of the upper horizontal drive electrode is different than the length of the lower horizontal drive electrode.

25. The MEMS actuator device of claim 20, wherein the lower horizontal drive electrode and upper horizontal drive electrode each define a length, and wherein the length of the upper horizontal drive electrode is similar or equal to the length of the second horizontal drive electrode.

26. The MEMS actuator device of claim 20, wherein the proof mass includes one or more drive tines.

27. The MEMS actuator device of claim 26, wherein each of the lower and upper horizontal drive electrodes defines a width along the direction of a sense axis parallel to the at least one substrate, and wherein said width is greater than a corresponding width of each respective drive tine.

28. The MEMS actuator device of claim 26, wherein each of the lower and upper horizontal drive electrodes defines a width along the direction of a sense axis parallel to the at least one substrate, and wherein said width is less than a corresponding width of each respective drive tine.

29. The MEMS actuator device of claim 20, wherein each of the lower and upper horizontal drive electrodes includes a number of split horizontal drive electrodes.

30. The MEMS actuator device of claim 20, wherein each of the lower and upper horizontal drive electrodes includes a single horizontal drive electrode.

31. The MEMS actuator device of claim 20, further comprising a motor drive voltage source for inducing a charge on the lower and upper horizontal drive electrodes.

32. The MEMS actuator device of claim 20, further comprising sensing means for sensing motion of the proof mass along a sense axis parallel to the lower and upper substrates.

33. The MEMS actuator device of claim 20, further comprising means for coupling the proof mass to the lower substrate.

34. The MEMS actuator device of claim 33, wherein said means for coupling the proof mass to the lower substrate includes one or more suspension springs.

35. A MEMS actuator device, comprising:
a set of vertically spaced horizontal drive electrodes; and
a movable proof mass adapted to oscillate back and forth horizontally in between the set of vertically spaced horizontal drive electrodes.

36. The MEMS actuator device of claim 35, wherein said set of vertically spaced horizontal drive electrodes includes at least one lower horizontal drive electrode and at least one upper horizontal drive electrode.

37. The MEMS actuator device of claim 36, wherein the proof mass comprises a planar structure having an upper surface and a lower surface.

38. The MEMS actuator device of claim 37, wherein the lower surface of the proof mass extends parallel or substantially parallel to an upper surface of the lower horizontal drive electrode.

39. The MEMS actuator device of claim 37, wherein the upper surface of the proof mass extends parallel to or substantially parallel to a lower surface of the upper horizontal drive electrode.

40. The MEMS actuator device of claim 36, wherein the lower horizontal drive electrode and upper horizontal drive electrode each define a length, and wherein the length of the upper horizontal drive electrode is different than the length of the lower horizontal drive electrode.

41. The MEMS actuator device of claim 36, wherein the lower horizontal drive electrode and upper horizontal drive electrode each define a length, and wherein the length of the upper horizontal drive electrode is similar or equal to the length of the second horizontal drive electrode.

42. The MEMS actuator device of claim 35, wherein the proof mass includes one or more drive tines.

43. The MEMS actuator device of claim 42, wherein each of the horizontal drive electrodes defines a width along the direction of a sense axis, and wherein said width is greater than a corresponding width of each respective drive tine.

44. The MEMS actuator device of claim 42, wherein each of the horizontal drive electrodes defines a width along the direction of a sense axis, and wherein said width it less than a corresponding width of each respective drive tine.

45. The MEMS actuator device of claim 35, wherein each set of vertically spaced horizontal drive electrodes includes a number of split horizontal drive electrodes.

46. The MEMS actuator device of claim 35, wherein each set of vertically spaced horizontal drive electrodes includes a single horizontal drive electrode.

47. The MEMS actuator device of claim 35, further comprising a motor drive voltage source for inducing a charge on each set of vertically spaced horizontal drive electrodes.

48. The MEMS actuator device of claim 35, further comprising sensing means for sensing motion of the proof mass along a sense axis.

49. A MEMS actuator device, comprising:
at least one substrate including one or more horizontal drive electrodes;
a proof mass adapted to oscillate back and forth horizontally in a space vertically adjacent each of the one or more horizontal drive electrodes; and
a motor drive voltage source for inducing a charge on each of the one or more horizontal drive electrodes.

50. A MEMS gyroscope, comprising:
at least one substrate including one or more horizontal drive electrodes;
a proof mass adapted to oscillate back and forth horizontally in a space vertically adjacent each of the one or more horizontal drive electrodes;
a motor drive voltage source for inducing a charge on each of the one or more horizontal drive electrodes; and
sensing means for sensing motion of the proof mass along a sense axis parallel to the at least one substrate.

51. The MEMS gyroscope of claim 50, wherein said at least one substrate comprises a lower substrate.

52. The MEMS gyroscope of claim 50, wherein said at least one substrate comprises an upper substrate.

53. The MEMS gyroscope of claim 50, wherein said at least one substrate comprises a lower substrate and an upper substrate.

54. The MEMS gyroscope of claim 53, wherein said one or more horizontal drive electrodes comprises:
a lower horizontal drive electrode coupled to the lower substrate; and an upper horizontal drive electrode coupled to the upper substrate.

55. The MEMS gyroscope of claim 54, wherein the proof mass comprises a planar structure having an upper surface and a lower surface.

56. The MEMS gyroscope of claim 55, wherein the lower surface of the proof mass extends parallel or substantially parallel to an upper surface of the lower horizontal drive electrode.

57. The MEMS gyroscope of claim 55, wherein the upper surface of the proof mass extends parallel to or substantially parallel to a lower surface of the upper horizontal drive electrode.

58. The MEMS gyroscope of claim 54, wherein the lower horizontal drive electrode and upper horizontal drive electrode each define a length, and wherein the length of the upper horizontal drive electrode is different than the length of the lower horizontal drive electrode.

59. The MEMS gyroscope of claim 54, wherein the lower horizontal drive electrode and upper horizontal drive electrode each define a length, and wherein the length of the upper horizontal drive electrode is similar or equal to the length of the second horizontal drive electrode.

60. The MEMS gyroscope of claim 50, wherein the proof mass includes one or more drive tines.

61. The MEMS gyroscope of claim 60, wherein each of the one or more horizontal drive electrodes defines a width along the direction of a sense axis parallel to the at least one substrate, and wherein said width is greater than a corresponding width of each respective drive tine.

62. The MEMS gyroscope of claim 60, wherein each of the one or more horizontal drive electrodes defines a width along the direction of a sense axis parallel to the at least one substrate, and wherein said width is less than a corresponding width of each respective drive tine.

63. The MEMS gyroscope of claim 50, wherein each of the one or more horizontal drive electrodes includes a number of split horizontal drive electrodes.

64. The MEMS gyroscope of claim 50, wherein each of the one or more horizontal drive electrodes includes a single horizontal drive electrode.

65. The MEMS gyroscope of claim 50, further comprising means for coupling the proof mass to the at least one substrate.

66. The MEMS gyroscope of claim 65, wherein said means for coupling the proof mass to the at least one substrate includes one or more suspension springs.

67. The MEMS gyroscope of claim 50, wherein said EMS gyroscope is an out-of-plane MEMS gyroscope.

68. A method for reducing rate bias errors and/or scale factor errors in a MEMS gyroscope, comprising the steps of:
providing a MEMS actuator device equipped with a set of vertically spaced horizontal drive electrodes, and a proof mass adapted to oscillate back and forth horizontally in between the set of vertically spaced horizontal drive electrodes;
applying a motor drive voltage to each set of vertically spaced horizontal drive electrodes; and
sensing motion of the proof mass along a sense axis of the device.

69. The method of claim 68, wherein said step of applying a motor drive voltage to each set of vertically spaced horizontal drive electrodes includes the step of reversing the polarity applied to each set of horizontal drive electrodes.

70. The method of claim 68, wherein the MEMS gyroscope includes a sense comb anchor for sensing motion of the proof mass along the sense axis, and wherein said step of sensing motion of the proof mass includes the step of applying a sense bias voltage to the sense comb anchor.

* * * * *